(12) United States Patent
Buckley et al.

(10) Patent No.: US 8,155,683 B2
(45) Date of Patent: Apr. 10, 2012

(54) PHYSICAL DOWNLINK CONTROL CHANNEL SPECIFIC SCRAMBLING

(75) Inventors: Michael Eoin Buckley, Grayslake, IL (US); Robert Love, Barrington, IL (US); Kenneth Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1070 days.

(21) Appl. No.: 12/026,094

(22) Filed: Feb. 5, 2008

(65) Prior Publication Data

US 2009/0197542 A1 Aug. 6, 2009

(51) Int. Cl.
*H04W 48/12* (2009.01)
*H04W 24/00* (2009.01)
*H04B 1/00* (2006.01)

(52) U.S. Cl. ......... 455/515; 455/517; 455/524; 455/69

(58) Field of Classification Search ................ None
See application file for complete search history.

(56) References Cited

U.S. PATENT DOCUMENTS

| | | | |
|---|---|---|---|
| 2002/0138721 A1* | 9/2002 | Kwon et al. | 713/151 |
| 2003/0063595 A1* | 4/2003 | You et al. | 370/342 |
| 2009/0046808 A1* | 2/2009 | Varadarajan et al. | 375/302 |

OTHER PUBLICATIONS

Mitsubishi Electric; UE specific DPCCH Scrambling for Low Complexity Blind Detection; #51 Meeting Jeju, Korea, Nov. 5-9, 2007.
Motorola; "CCE Scrambling for Reliable PDCCH Location Detection Discussion and Decision"; Sevilla, Spain, Jan. 14-18, 2008.

* cited by examiner

*Primary Examiner* — Philip Sobutka
(74) *Attorney, Agent, or Firm* — Matthew C. Loppnow; Roland K. Bowler II (57) ABSTRACT

A method, apparatus, and electronic device for creating a connection between a base station and user equipment are disclosed. A transceiver 202 may receive a physical downlink control channel signal containing a control message subjected to an encoding. A processor 204 may decode the control message. The processor 204 may determine a control channel element of the physical downlink control channel signal for the control message based in part upon the encoding.

9 Claims, 7 Drawing Sheets

PHYSICAL DOWNLINK CONTROL CHANNEL SPECIFIC SCRAMBLING

FIELD OF THE INVENTION

The present invention relates to a method and system for establishing a data connection. The present invention further relates to using a physical downlink control channel to develop the data connection.

INTRODUCTION

The Third Generation Partnership Project (3GPP) is developing a globally applicable evolved universal terrestrial radio access (E-UTRA). E-UTRA may use a physical downlink control channel (PDCCH) to establish a data connection between a base station and user equipment (UE). The PDCCH may be used to signal the format of the data connection to UE.

SUMMARY OF THE INVENTION

A method, apparatus, and electronic device for creating a connection between a base station and user equipment are disclosed. A transceiver may receive a physical downlink control channel signal containing a control message subjected to an encoding. A processor may decode the control message. The processor may determine a control channel element of the physical downlink control channel signal for the control message based in part upon the encoding.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for creating a connection between a base station and user equipment are disclosed. A transceiver may receive a physical downlink control channel signal containing a control message subjected to an encoding. A processor may decode the control message. The processor may determine an initial control channel element of the physical downlink control channel signal for the control message based in part upon the encoding.

Figure 1:
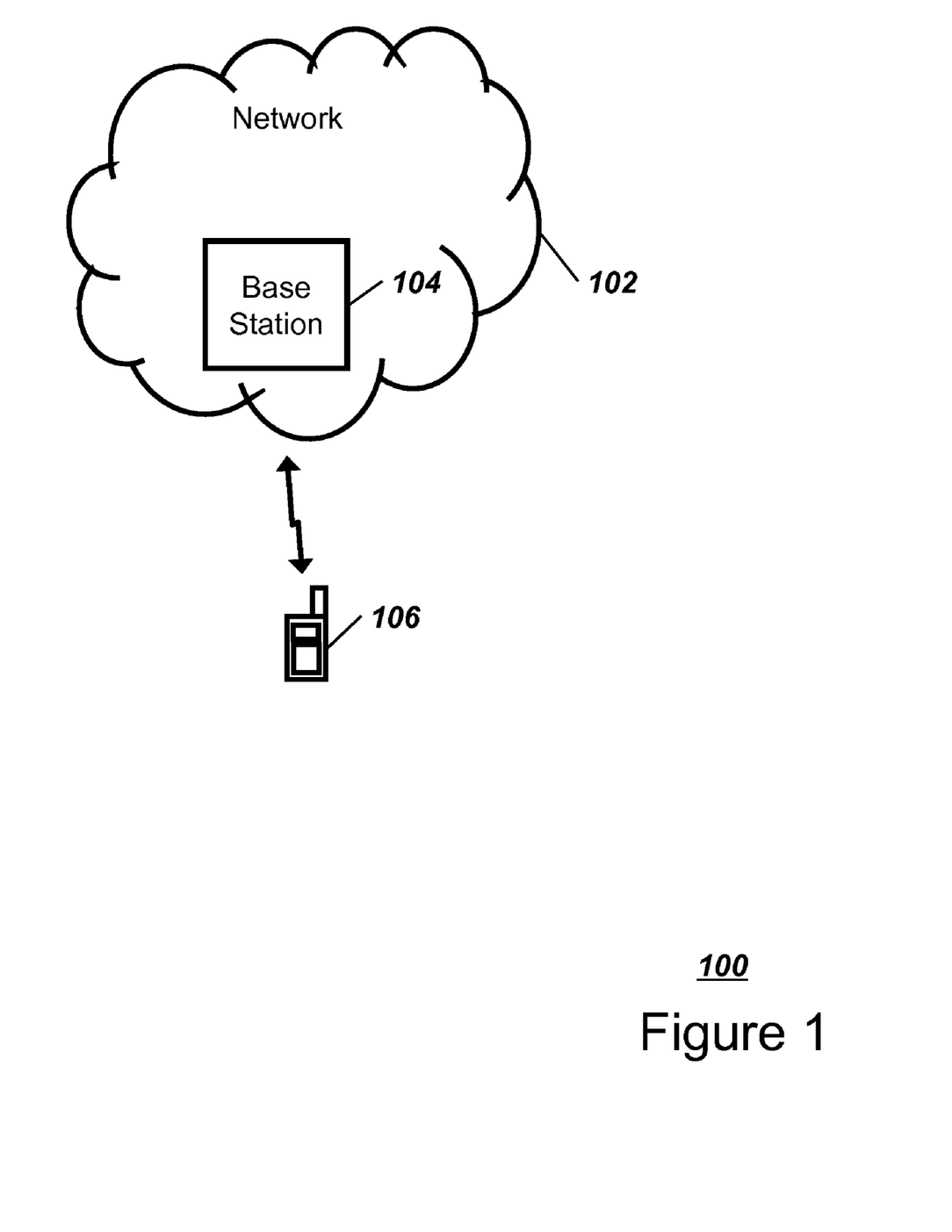
FIG. 1 illustrates one embodiment of a communication system.

FIG. 1 illustrates one embodiment of a communication system 100. The communication system 100 may include a network 102, base station 104, and user equipment (UE) 106. Various communication devices may exchange data or information through the network 102. The network 102 may be an evolved universal terrestrial radio access (E-UTRA), or other type of telecommunication network. A network entity, such as the base station 104, may assign a UE identifier (UEID) to the UE 106 when the UE 106 first joins the network 102. For one embodiment, the base station 104 may be a distributed set of servers in the network. The UE 106 may be one of several types of handheld or mobile devices, such as, a mobile phone, a laptop, or a personal digital assistant (PDA). For one embodiment, the UE 106 may be a WiFi® capable device, a WiMax® capable device, or other wireless devices.

Figure 2:
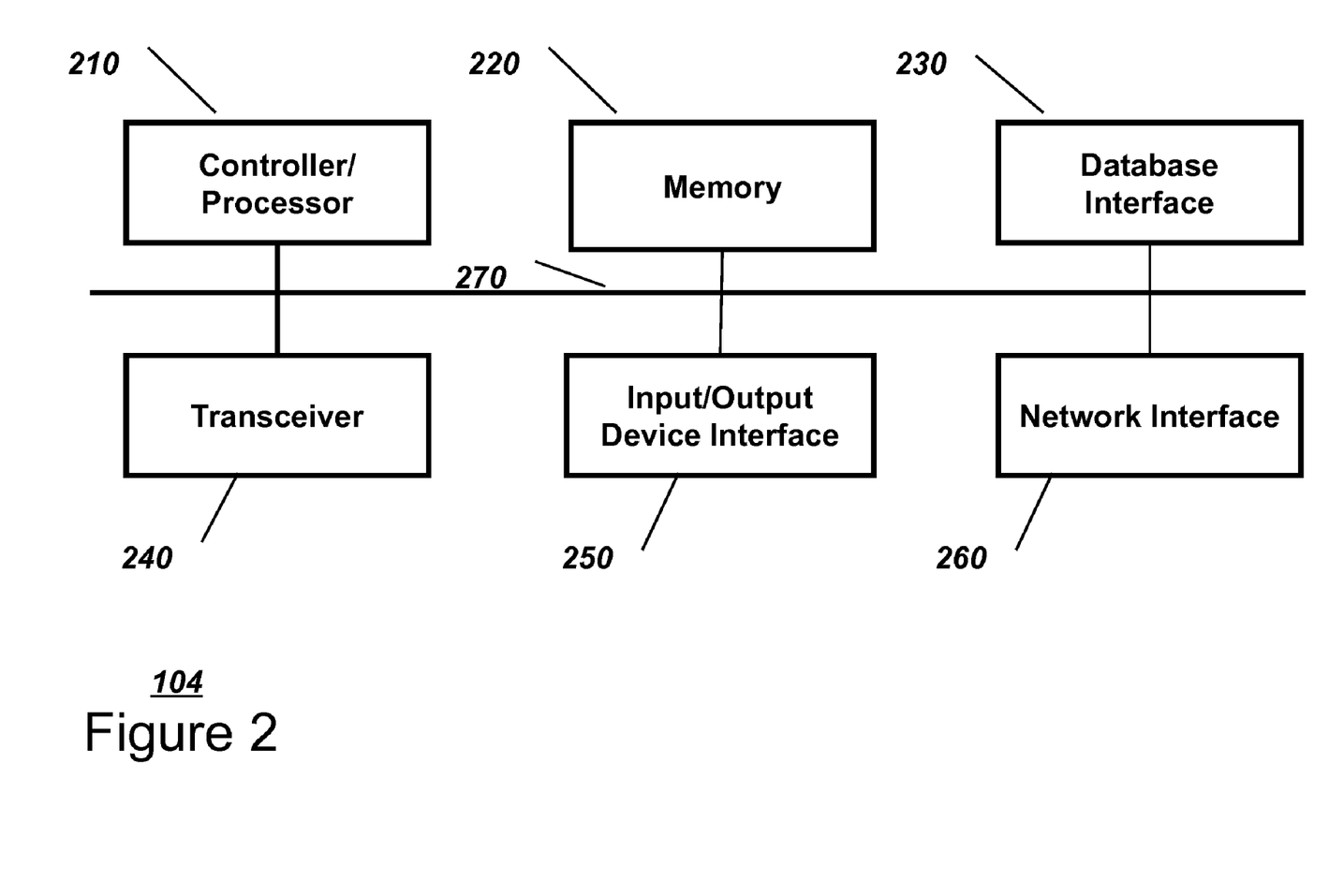
FIG. 2 illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM, digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the UE 106 to the network 102.

The transceiver 240 may create a data connection with the UE 106. The transceiver may create a physical downlink control channel (PDCCH) and a physical uplink control channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
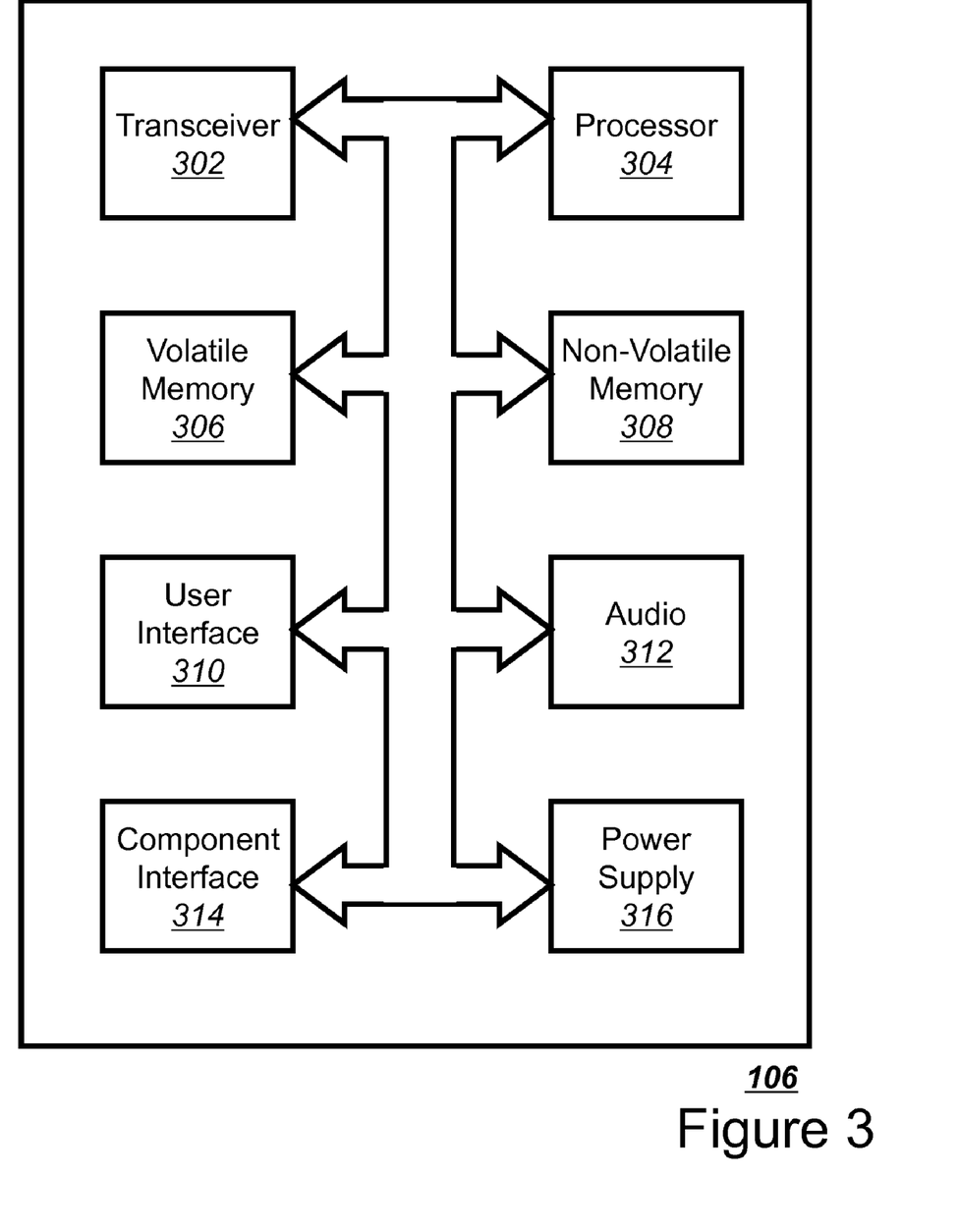
FIG. 3 illustrates in a block diagram one embodiment of the user equipment.

FIG. 3 illustrates in a block diagram one embodiment of the UE 106. The UE 106 may be capable of accessing the information or data stored in the network 102. For some embodiments of the present invention, the UE 106 may also support one or more applications for performing various communications with the network 102. The UE 106 may be a handheld device, such as, a mobile phone, a laptop, or a personal digital assistant (PDA). For some embodiments of the present invention, the UE 106 may be WiFi® capable device, which may be used to access the network 102 for data or by voice using VOIP.

The UE 106 may include a transceiver 302, which is capable of sending and receiving data over the network 102.

The UE 106 may include a processor 304 that executes stored programs. The UE 106 may also include a volatile memory 306 and a non-volatile memory 308 which are used by the processor 304. The UE 106 may include a user input interface 310 that may comprise elements such as a keypad, display, touch screen, and the like. The UE 106 may also include a user output device that may comprise a display screen and an audio interface 312 that may comprise elements such as a microphone, earphone, and speaker. The UE 106 also may include a component interface 314 to which additional elements may be attached, for example, a universal serial bus (USB) interface. Finally, the UE 106 may include a power supply 316.

Figure 4:
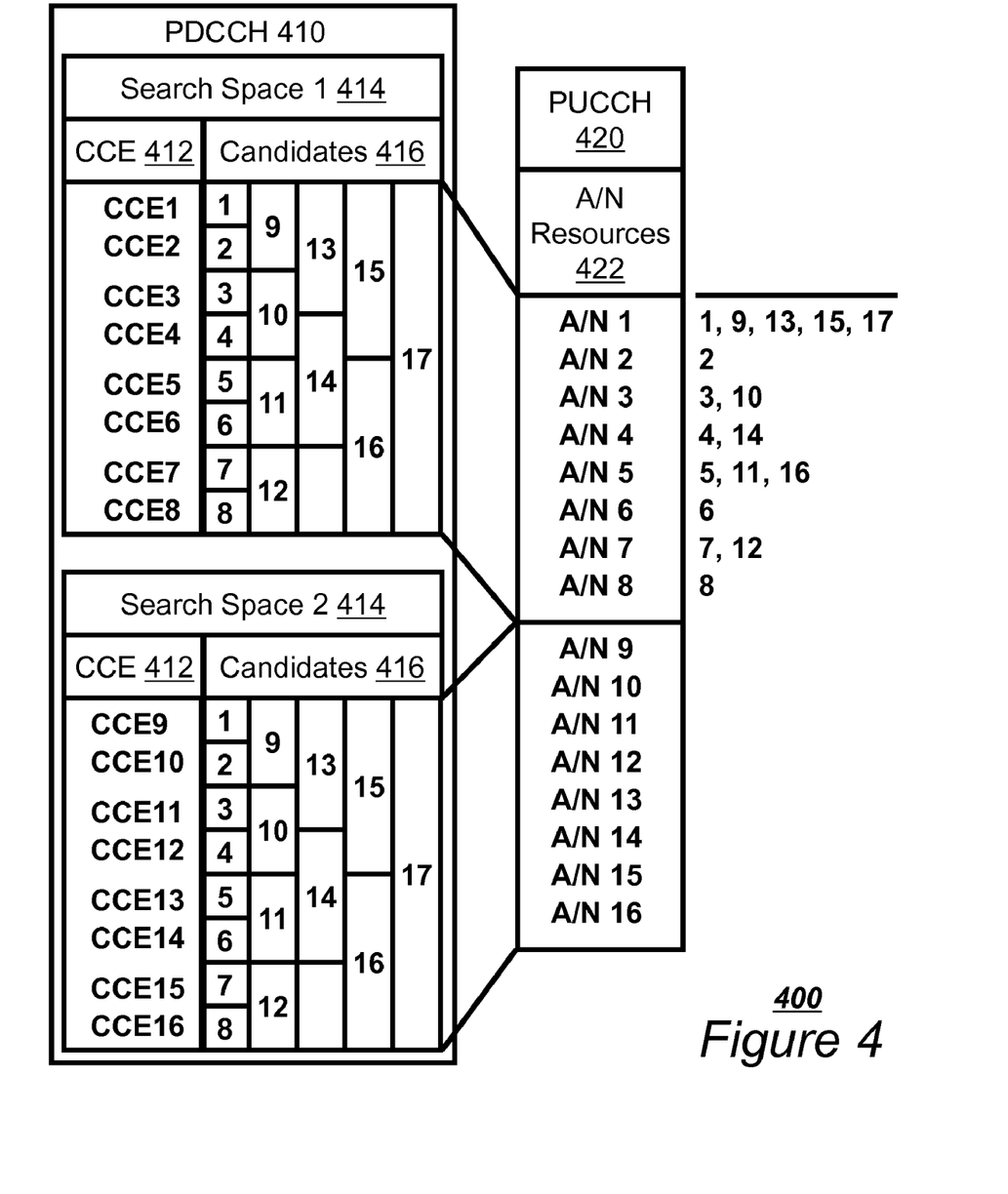
FIG. 4 illustrates in a block diagram one embodiment of a configuration of the set of control channels.

The UE 106 may use a set of control channels to establish a data connection between the UE 106 and the base station 104. FIG. 4 illustrates in a block diagram one embodiment of a configuration 400 of the set of control channels. The set of control channels may include a PDCCH 410 and a PUCCH 420. The UE 106 may decode any control information, such as data format instructions received via a PDCCH signal 410. The base station 104 may send control data to the UE 106 via the PDCCH 410. The PDCCH 410 may be transmitted on a series of one or more control channel elements (CCEs) 412. The CCEs 412 may be organized into a search space 414, containing a set number of CCEs 412. For example, the search space 414 may have eight CCEs 412. Each search space 414 may have a number of PDCCH candidates 416 having one or more CCEs 412. The number of PDCCH candidates 416 may be based upon the number of CCEs 412 in the search space 414. For example, an eight CCE 412 search space 414 may have seventeen PDCCH candidates 416.

The UE 106 may determine the initial CCE 412 in which the PDCCH candidate 416 containing a control message begins. The UE 106 may have a set of one or more acknowledgment (ACK)/negative acknowledgment (NACK) resources 422 to send an ACK/NACK message on the PUCCH 420. The ACK/NACK message may indicate whether the UE 106 successfully decoded the formatting message. An ACK/NACK message sent from the wrong ACK/NACK resource 422 may result in an ACK signal being mistaken for a NACK. Each ACK/NACK resource 422 may be mapped to the initial CCE 412 of each PDCCH candidate 416, allowing the proper ACK/NACK resource 422 for the control message to be determined.

Figure 5:
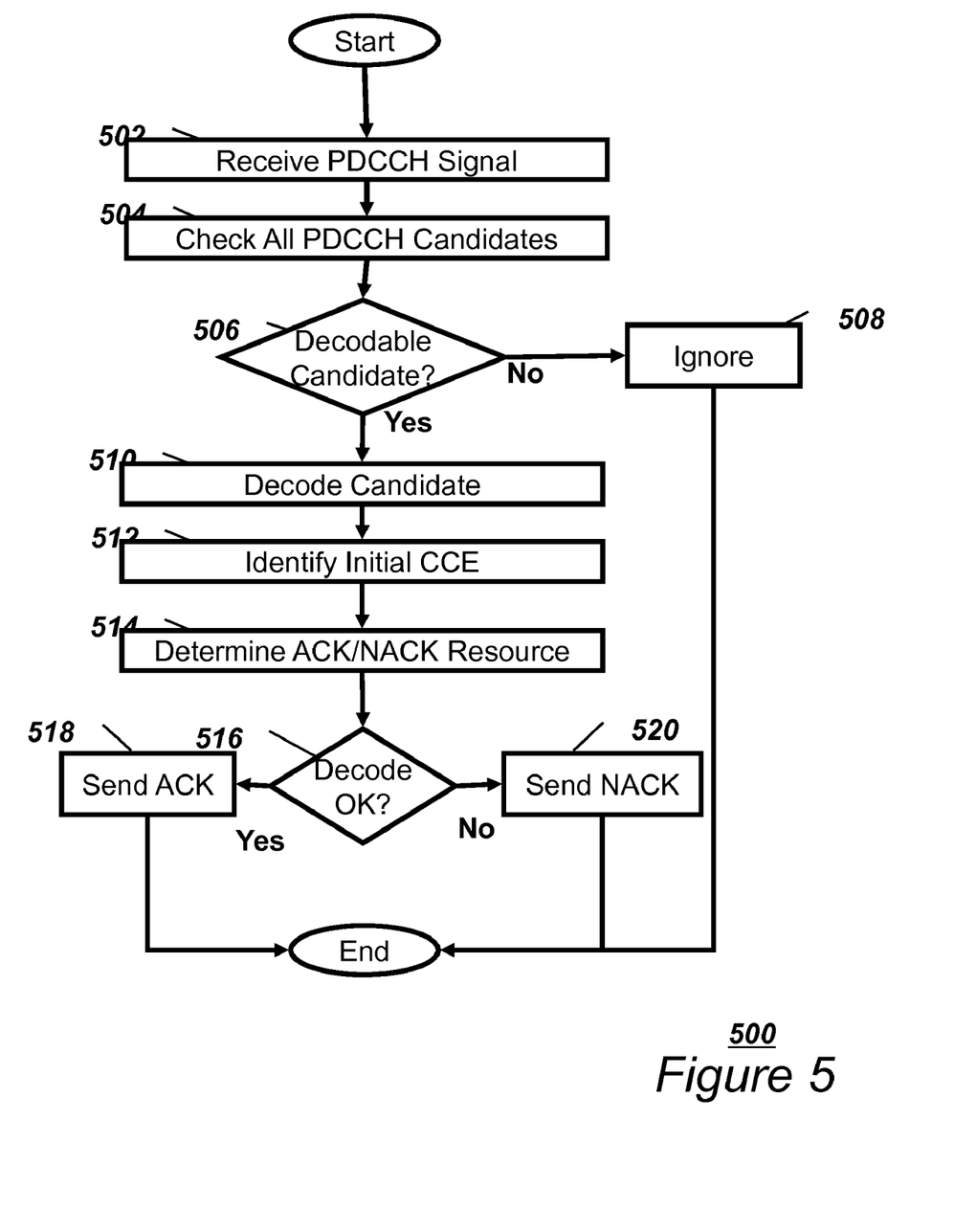
FIG. 5 illustrates in a flowchart one embodiment of a method for acknowledging successful decoding of a formatting message.

FIG. 5 illustrates in a flowchart one embodiment of a method 500 for acknowledging successful decoding of a formatting message. The UE 106 may receive a PDCCH signal 410 from the base station 104 (Block 502). The UE 106 may check every candidate 416 in a search space 414 to see if one is decodable (Block 504). If no decodable candidate 414 is present (Block 506), the UE 106 may ignore the PDCCH signal 410 (Block 508). If one decodable candidate 416 is present (Block 506), the UE 106 may decode the candidate 416 (Block 510). The UE 106 may identify the initial CCE 412 based on the encoding on the control message (Block 512). Once the initial CCE 412 is identified, the UE 106 may determine which ACK/NACK resource 422 to use based upon the initial CCE 412 (Block 514). If the decoding is successful (Block 516), the UE 106 sends an ACK to the base station 104 (Block 518). If the decoding is not successful (Block 516), the UE 106 sends a NACK to the base station 104 (Block 520).

Figure 6:
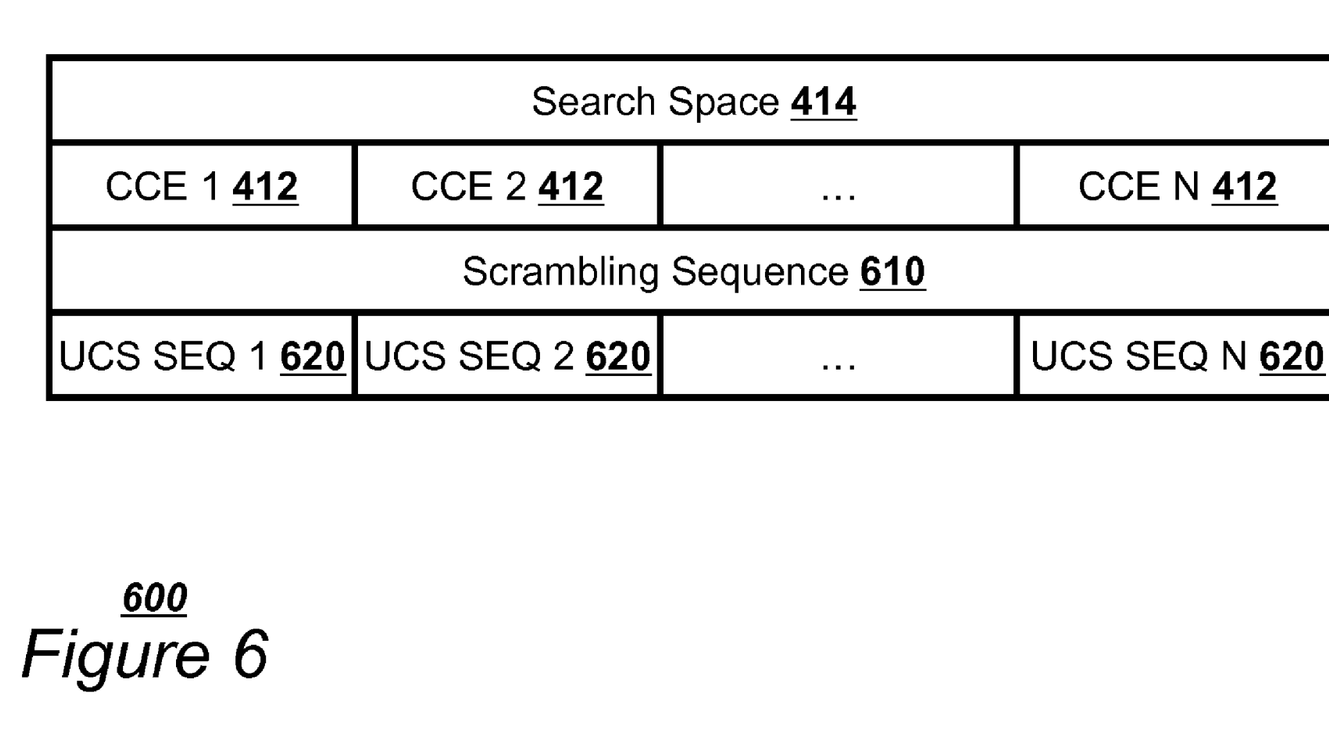
FIG. 6 illustrates in a block diagram one embodiment of a comparison of scrambling sequences.

The UE 106 may use the encoding of the control message to identify the initial CCE 412. This encoding may include the scrambling sequence the base station 104 applied to the control message, masking applied to a cyclical redundancy check (CRC) parity field, or other encoding technology applied to the control message. The UE 106 may scramble the control message using a pseudo-random scrambling sequence. FIG. 6 illustrates in a block diagram one embodiment of a comparison 600 of scrambling sequences. As stated previously, a search space 412 in the PDCCH signal 410 may be divided into a number of CCEs 412. A scrambling sequence 610 may be generated from pseudo-random number generator. The scrambling sequence 610 may equal the length of the search space 414. The base station 104 may share the start of the scrambling sequence with the UE 106. The UE 106 may use the start of the scrambling sequence to identify the initial CCE 412 of the control message.

The base station 104 may also generate a unique CCE scrambling sequence (UCS SEQ) 620 for each CCE 412 within the search space 414. The base station 104 may share each UCS SEQ 620 with the UE 106. The UE 106 may then use the UCS SEQ to identify the initial CCE 412 of the control message.

Figure 7:
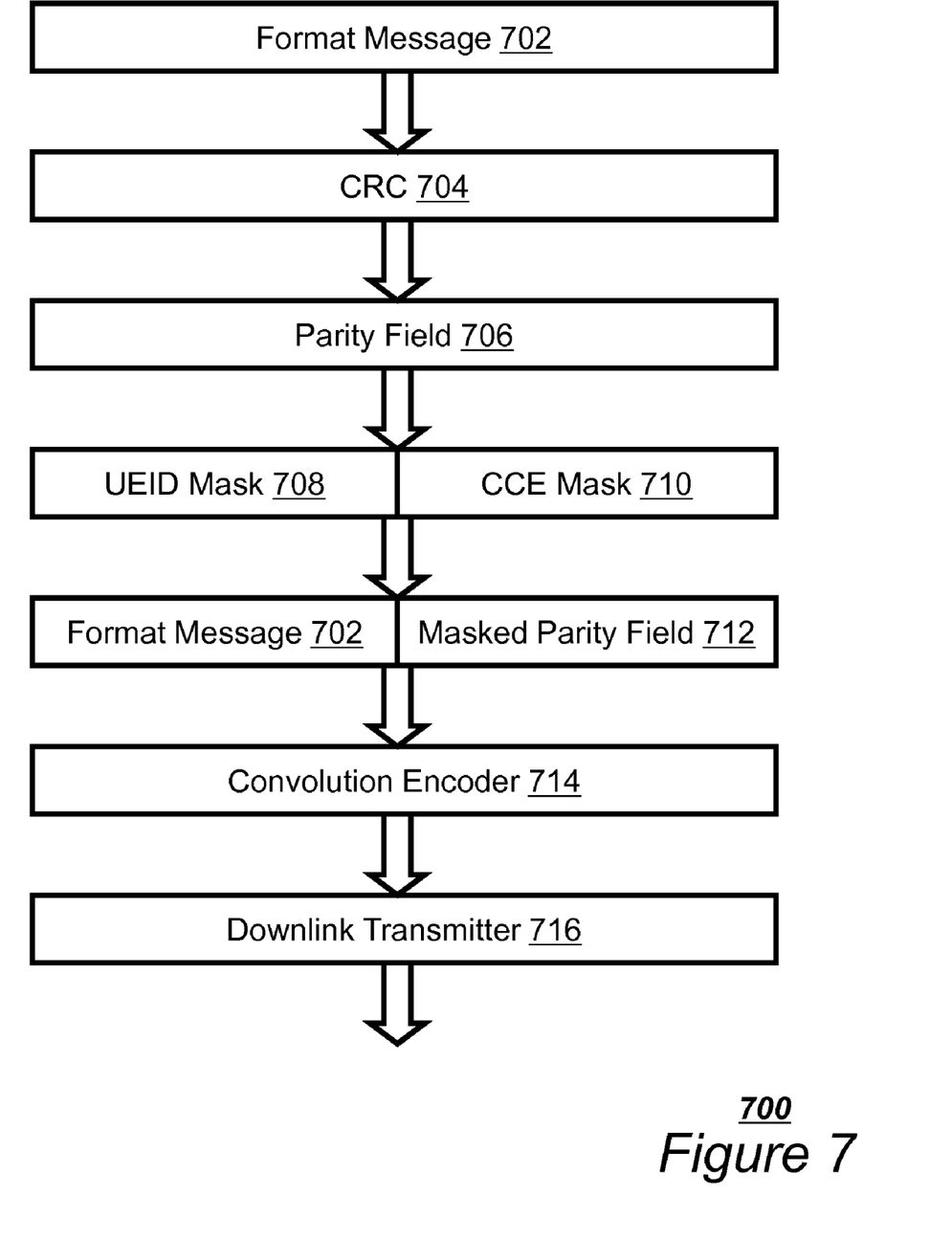
FIG. 7 illustrates in a flow block diagram one embodiment of a process for encoding a formatting message.

The base station 104 may also encode an identifier of the initial CCE 412 of the control message in the masking of the CRC parity field of the control message. FIG. 7 illustrates in a flow block diagram one embodiment of a process 700 for encoding a formatting message. The base station 104 may have a format message 702 to transmit on the PDCCH channel. The format message may be any size, such as, for example 48 bits. A cyclical redundancy check (CRC) 704 may be performed on the format message 702, creating a parity field 706. The base station 104 may apply a mask to the parity field, such as a mask 708 based upon a UE identifier (UEID) assigned to the UE 106 by the base station 104. Some parity fields 706 may be longer than the UEID 708. For example, a UEID may be 16 bits while the parity field 706 that it masks may be 20 bits. In these instances, the base station 104 may leave the last bits left unmasked, may mask the last bits with a predetermined sequence, or may mask 710 the final bits using an identifier signaling the initial CCE 412.

After the UEID mask 708 and the CCE mask 710 have been applied to the parity field 706, the base station 104 may append the masked parity field 712 to the format message 702. A convolution encoder 714 may scramble the entire control message, including the format message 702 and the masked parity field 712. The base station 104 may then pass the encoded message to a transmitter 716 to be sent downlink. When the UE 106 decodes the message, the UE 106 may use the CCE mask 710 on the CRC parity field to determine the initial CCE 412. The UE 106 may also use the UEID mask 708 to determine if the message was received by the correct UE 106.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for creating a data connection between a base and user equipment, comprising:
   receiving a physical downlink control channel signal containing a control message having an encoding;
   decoding the control message; and
   determining a control channel element of the physical downlink control channel signal for the control message based in part upon the encoding,
   wherein at least a portion of the control message is scrambled with a unique scrambling sequence matched to the control channel element, and
   wherein determining comprises determining the control channel element of the physical downlink control channel signal for the control message based in part upon the unique scrambling sequence.

2. The method of claim 1, wherein the encoding includes scrambling the control message with a scrambling sequence.

3. The method of claim 1, further comprising
   determining an acknowledgment/negative acknowledgment transmission resource based in part upon the control channel element.

4. A telecommunications apparatus for creating a data connection between a base and user equipment, comprising:
   a transceiver that receives a physical downlink control channel signal containing a control message having an encoding; and
   a processor that decodes the control message and determines a control channel element of the physical downlink control channel signal for the control message based in part upon the encoding, wherein at least a portion of the control message is scrambled with a unique scrambling sequence matched to the control channel element, and wherein the processor determines the control channel element of the physical downlink control channel signal for the control message based in part upon the unique scrambling sequence.

5. The telecommunications apparatus of claim 4, wherein the encoding includes scrambling the control message with a scrambling sequence.

6. The telecommunications apparatus of claim 5, further comprising
an acknowledgment/negative acknowledgment transmission resource selected based in part upon the control channel element.

7. An electronic device for creating a data connection between a base and user equipment, comprising:
a transceiver that receives a physical downlink control channel signal containing a control message including a parity field, an identifier of a control channel element of the physical downlink control channel signal for the control message masking at least a portion of the parity field; and
a processor that decodes the control message and determines the control channel element based in part upon the identifier, wherein at least a portion of the control message is scrambled with a unique scrambling sequence matched to the control channel element, and wherein the processor determines the control channel element of the physical downlink control channel signal for the control message based in part upon the unique scrambling sequence.

8. The electronic device of claim 7, wherein the control message is scrambled with a scrambling sequence and the processor determines the control channel element based in part on the scrambling sequence starts.

9. The electronic device of claim 7, further comprising
an acknowledgment/negative acknowledgment transmission resource selected based in part upon the control channel element.

* * * * *